United States Patent Office 3,252,923
Patented May 24, 1966

3,252,923
FOAMED POLYESTER EPOXIDE RESIN COMPOSITIONS AND METHOD OF MAKING SAME
Alvaro Salgado, Union, N.J., and Ismar Berlinger, Brooklyn, N.Y., assignors to Reichhold Chemicals, Inc., Detroit, Mich.
No Drawing. Filed Apr. 18, 1962, Ser. No. 188,555
18 Claims. (Cl. 260—2.5)

The invention relates generally to foamed resin compositions and more particularly, to foamed resins produced from compositions comprising unsaturated polyesters and epoxides or epoxy resins with the aid of a vaporizable blowing agent.

More specifically, the invention relates to the manufacture of in situ foam resins from a resin composition comprising (a) unsaturated polyester components including unsaturated alkyd components and a monomer such as styrene polymerizable with the alkyd, (b) a curable epoxy compound or epoxide or components thereof, and (c) a vaporizable, blowing or foaming agent wherein the polyester components, including the monomer, are polymerized preferably with the aid of a polymerization initiator of the peroxide type, and of a polymerization accelerator such as cobalt naphthenate or other heavy metal salt, and the curing or hardening of the epoxide by the use of a suitable epoxy hardener, preferably a Lewis acid such as a boron trifluoride which may be in alcohol or ether solution, forming a complex such as boron trifluoride etherate.

Foamed resins are relatively well known, including certain techniques of their manufacture. Many of the resin foams of this type are made from thermoplastic polymers. However, because of the inherent characteristics of these polymers, it is readily apparent that they have limited utility. Particularly, their relatively low-temperature softening characteristic has been a limiting factor in their application.

Also, many foamed resins of this type require extremely complicated foaming equipment. Polyester foams heretofore required special foaming apparatus and very critical timing to avoid gelling the resin while still in the foaming equipment.

Polyester foams offer the user convenient resin viscosities providing for better batch mixing. The resin also fills out its forms better than high viscosity resins. The cost of polyester foams makes it competitive with the low cost thermoplastic foams. Another drawback is the lack of adhesion of some foamed resins.

A particular object of this invention is to provide a foam which requires inexpensive apparatus for foaming.

Therefore, it is an object of this invention to form an improved room-temperature curable foam resin composition which is extremely tough, durable, and has good adhesion to many substrates, and which has good cell structure distributed throughout the foamed mass. When in its final cured form, this foam is infusible and has a high heat distortion temperature. This material is especially suited for situations requiring "foamed-in-place" or in situ resins, i.e., to fill varied shaped voids with foam for encapsulating or insulating purposes at room or elevated temperatures.

The foam may be rendered fire retardant if desired by the incorporation of either a flame retardant polyester, epoxide, or a combination of both. Such flame retardant additives as are known to the art include halogenated compounds or materials containing phosphorus or antimony and may be incorporated alone or in conjunction with the aforementioned flame retardant foam components.

Another method of imparting flame retarding characteristics is set forth in our application, Serial No. 170,304, filed January 16, 1962.

It is a further object of the invention to provide a foam which has a controllable expansion, cell size, and open to closed cell ratio, within some limitations, this being attained by variations in the amount of epoxide used and in the amount of blowing agent introduced into the system.

It is a still further object to provide a foam which will not exhibit "post-expansion shrinkage."

It is a still further object of the invention to provide a foam, the physical characteristics of which (by merely changing the ratio of polyester to epoxide or the resin intermediates) may be varied to meet differing requirements.

Promoted polyester resins set some time after the addition of an initiator forming a mass of gelatinous consistency. As is known to those skilled in the art, a room temperature catalyzed polyester resin will emit heat only after gelation has already occurred. Upon gelation of the polyester, the physical shape of the set resin cannot be altered without actual rupturing and tearing. It is an object of this invention to prepare a foamed polyester resin, which, while requiring heat to institute foaming does not evolve appreciable heat prior to gelation.

This invention incorporates the useful qualities of epoxy resins in attaining a foamed polyester. The epoxide, which is compatible with the unsaturated polyester resin and which cures to a thermosetting resin, evolves considerable heat when reacted with an epoxy catalyst. The heat accomplishes the result of vaporizing the blowing agent and inducing foam expansion.

These and other objects and features of this invention will be apparent in the description herein.

The polyester portion of the foam comprises a mixture of (A) the reaction product of one or more polyhydric alcohols with one or more dicarboxylic acids wherein at least one component contains alpha beta ethylenic unsaturation, and (B) polymerizable monomers containing carbon-to-carbon unsaturation. Such unsaturated polyesters, their constituent ingredients or components and the method of manufacturing the same are well known in the art, and are described for example in "Polyesters and Their Application," Reinhold Publishing Co., 1956, but for the purpose of illustration will be briefly discussed hereinafter. See also definition of polyester resins appearing in Reinhold, the Chemical Dictionary, 5th ed., page 879.

Such polyesters are usually made by esterifying, at elevated temperatures, one or more polyhydric alcohols and one or more alpha beta ethylenically unsaturated dicarboxylic acids until an acid number of about between 5 and 80, and preferably, between 20 and 50 is reached, whereupon the resultant unsaturated alkyd is blended with a stabilizer and a polymerizable monomer or cross linking agent having at least one —C=CH$_2$ group of which styrene may be mentioned as illustrative. The weight ratio of the alkyd to the polymerizable monomer may be varied between 95:5 and 5:95.

Depending upon the kind of monomer and upon the behavior of the alkyd, the preferred weight ratio is generally between about 55 alkyd to 45 monomer and about 85 alkyd to 15 monomer.

The said polyhydric alcohols considered as starting materials or as reactants for this reaction include saturated and unsaturated aliphatic glycols, such as ethylene glycol, propylene glycol-1, 2, propylene glycol-1, 3, butylene glycol-1, 2, butylene glycol-1, 4, pentane diol-1, 5, the hexylene glycols, neopentyl glycol, 2-butene-1, 4 diol, 2-methyl-3-butyn-2-ol, 3-methyl-1-pentyl-e-ol, etc. They also include dihydroxy polyethers, such as diethylene glycol, dipropylene glycol, triethylene glycol and also the higher polyglycols of waxy consistency, which latter are called commercially "Carbowaxes." The above are mentioned as illustrative only, not by way of limitation.

Also, cyclo-aliphatic diols, such as 1,1-isopropylidene dicyclohexanol (hydrogenated bisphenol) may be utilized. The ethylenically unsaturated alpha beta dicarboxylic acids considered as starting materials may include among others maleic acid, fumaric acid, aconitic acid, itaconic acid, mono chloromaleic acid, etc., and the corresponding anhydrides of the cis-acids and mixtures thereof. These ethylenically unsaturated dicarboxylic acids may be partially replaced with either saturated carboxylic acids or those discarboxylic acids which contain only benzenoid unsaturation. This group includes among others adipic acid, azelaic acid, sebacic acid, dimerized fat acids, phthalic acid, tetrahydrophthalic acid, tetrochlorophthalic anhydride, chlorendic acid, hexahydrophthalic acid, etc., or mixtures thereof, as well as the anhydrides of those acids which are capable of forming it. Up to ten mols of those dicarboxylic acids having no ethylenic unsaturation may be used per each mol of ethylenically unsaturated dicarboxylic acid containing no unsaturation other than benzenoid but such molecular ratio is preferably between about 5:1 and 1:5.

The group of polymerizable monomers or cross linking agents includes the vinyl monomers, such as styrene, vinyl toluene, diallyl phthalate, triallyl cyanurate, triallyl citrate, diallyl maleate, diallyl furmarate, the isomers of dichorosytrene, etc. and mixtures thereof. The groups further includes methyl methacrylate, ethyl ethacrylate, methyl acrylate, ethyl acrylate, etc., and mixtures thereof.

In order to prevent gelation during manufacture and storage, the polyester resin may be stabilized as is known in the art. Some of the well-known stabilizers are of the phenolic or quinoid type and include hydroquinone, quinone, tertiary butyl catechol, etc., and others, such as quanternary ammonium salts, esters of phosphorus acid, copper salts, gaseous oxygen, etc. The above well-known stabilizers are mentioned by way of illustration only and not by way of limitation.

To initiate the curing of the unsaturated polyester resins, suitable catalyst may be employed, particularly peroxide catalysts, such as are illustratively described in "Polyesters and Their Application," Reinhold, 1956, pages 49–51.

In accordance with the present invention the unsaturated polyester resins may be cured to insoluble and infusible copolymers by the use of suitable curing agents, i.e. peroxides and hydroperoxides. Commonly used peroxides are benzoyl peroxide, methyl ethyl ketone peroxide, cyclohexanone peroxide, hydrogen peroxide, lauroyl peroxide, tertiary butyl perbenzoate, diacetyl-peroxide, cumene hydro-peroxide, etc. For even faster cure, peroxides are often used in combination, and also in the presence of metallic and amine promoters. Metallic promoters include the heavy metals, such as cobalt and the salts of heavy metals, such as cobalt naphthenate, cobalt octoate, manganese octoate, ferric napththenate, cupric napththenate, etc. The amine promoters include dimethyl aniline, diethyl aniline, methyl ethyl aniline, etc. The above well-known curing agents are mentioned only by way of illustration and not by way of limitation; others being applicable, as well-known to those skilled in the art.

The foam composition of this invention also incorporates a vaporizable blowing agent or agents preferably selected from a class of liquid, inert organic compounds having boiling points from between 20° to 60° C. for the room temperature foaming operation. Suitable blowing agents are the class of compounds included under the term Freon, which is the trademark of the Corning Glass Works, Corning, N.Y., which term covers a line of fluorinated hydrocarbons used as refrigerants, propellants, blowing agents, etc., as defined in Reinhold's, The Condensed Chemical Dictionary, 6th edition, page 515. As a specific example of one particular Freon may be mentioned Freon-11 or F–11, which is trichloromonofluoromethane. The vapor formed by slightly heating the blowing agent causes bubbles to form with foam ensuing.

Epoxy resin intermediates are well-known in the art and are described in "Epoxy Resins," by Irving Skeist, Reinhold Publishing Company, copyright 1958, pages 11–20, and in "Polymer Processes" by Schildknecht, 1956, vol. X, page 429, et seq., and are refined in Reinhold, "The Condensed Chemical Dictionary," 6th edition, page 445. Such resins are characterized in that they contain the epoxide group. As illustrative of such resins, may be mentioned those derived from epichlorhydrin or its equivalent and a diphenol, glycol of glycerine. A resin derived from the reaction of epichlorhydrin and bisphenol A may be mentioned as typical and is referred to hereinafter in the examples as epoxy A.

*Epoxy preparation*

The preparation of a low molecular weight polyglycidyl ether from a dihydric phenol may be illustrated by the following:

925 parts by weight (10 mols) of epichlorohydrin, 228 parts (1 mol) of 2,2'bis(4-hydroxyphenyl) propane, and 2 parts of water are charged into a reaction vessel fitted with an agitator, thermometer, and a reflux condenser. The mixture is heated to 70° C. whereby a clear solution is obtained. To this solution there is added over a period of one half hour 82 parts (slightly over 2 mols) of sodium hydroxide pellets. The reaction is exothermic and external cooling is provided to keep the temperature of this reaction between 70° C. and 90° C. After all of the sodium hydroxide is added, the reaction mixture is heated to 90° C. and kept at this temperature for ¾ hours in order to complete the reaction. The mixture is then cooled to room temperature and filtered to remove insoluble matter. The filtrate is then subjected to vacuum distillation for 1 hour at 120° C. and 2 mm. pressure, whereby the epichlorohydrin, water and other volatiles are removed. The residue which represents the crude polyglycidyl ether is further purified by dissolving it in an equal weight of benzene followed by filtration. The benzene and other volatile matter is then removed by subjecting the solution to vacuum distillation up to 150° C. and 2 mm. pressure. After all of the benzene is removed, distillation is continued for one hour at 150° C. and 2 mm. pressure in order to assure removal of volatile matter from the product. The product is then cooled to room temperature and brought to atmospheric pressure by breaking the vacuum. The polyglycidyl ether obtained in a yield of 325 parts is a pale yellow viscous liquid that is found to have molecular weight of 370 and an epoxide equivalent of 195.

The epoxy ether condensation polymer has the following structure

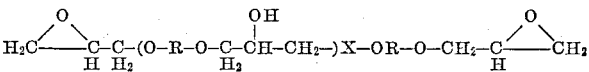

where X is equal from about 0 to 20 units and R symbolizes the hydrocarbon substituent of a dihydric phenol, such as bis(4-hydroxyphenyl) - 2,2-propane, known by those skilled in the art as Bisphenol A. It is understood that "X" denotes an average of such units since every batch of epoxy resin produced contains a range of higher and lower molecular weight polymer chains. As the average "X" increases, the viscosity of the epoxy resin increases. The condensation products of polyphenols, such as low molecular weight novolacs with epichlorohydrin are amenable to the foaming reaction. So are the glycidyl ethers of glycols and triols and other aliphatic polyols likewise containing oxirane groupings. The reaction products of Novolacs and epichlorohydrin are known as epoxy resin intermediates and are referred to as Epoxy-Resins by Irving Skeist, Reinhold Publishing Corporation, 1958, pages 1–9 and 108. The upper limit of epoxy viscosity is governed by the feasibility of foaming a polyester-epoxy-styrene-Freon system in view of controlling the foam characteristics.

Other operable compounds pertaining to the invention are compounds containing an oxirane structure of the general formula

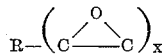

where R can be either aliphatic or aromatic, or a combination of both, and containing Br, Cl, OH, or other substituents and when X is an integer such as 1, 2, 3, etc. The designation "Epoxy B" in later references is applied to epichlorohydrin, which is one of the simplest of operative oxirane containing chemicals.

A wide range of catalysts or curing agents for epoxy resins are known, these being generally included under the term "Lewis Acids." Particularly suitable for the purposes of the present invention are boron trifluoride, and its compounds or complexes, for example, boron trifluoride etherate (Reinhold, The Condensed Chemical Dictionary, 6th edition, page 166), which solution is included under the term—borontrifluoride.

When reacted with a hardener or curing catalyst, the epoxide exotherms or gives off heat and this heat is transferred to the blowing agent which vaporizes and causes a foaming action. The heat of the reaction also promotes faster polyester gelation, so that the polyester will gel at the height of the foaming action.

A surface acting agent or surfactant is preferably employed in my improved invention to effect uniform foaming and rising of the foam, rather than to allow the bubbles to break the surface. Such surface acting agents are well known in the art and are generally defined in Rheinhold, "The Condensed Chemical Dictionary" at page 1098. Particularly suitable are the non-ionic surface acting agents prepared by the addition of ethylene oxide to polypropylene oxide, and designated with the trade name "Pluronic" (Reinhold's, The Condensed Chemical Dictionary, 6th edition, page 906). The name "Pluronic" is a trade name of the Wyandotte Chemicals Corporation, of Wyandotte, Michigan. The use of such surface acting agents in connection with the production of epoxy resins is described in "Epoxy Resins" by Skeist, Reinhold Publishing Corporation, 1958, pages 249–251. "Pluronic L-62" may be referred to as ilustrative for the purpose of the present invention. The surface active agent used in the following examples is "Pluronic L-62," which has the following structure:

$$HO(C_2H_4O)_a—(C_3H_6O)_b—(C_2H_4O)_c—H$$

where the "$a$" and "$c$" portions constitute from about 16% to about 80% of the total weight of the non-ionic agent.

| Compound | Range, percent | Function |
|---|---|---|
| Polyester Resin | 30–90 | Base resin. |
| Epoxide | 10–70 | Heat providing agent for vapor expansions and for quickening the gel of the Polyester. |
| Styrene | 0–30 | Monomer—to adjust viscosity for correct consistency for foaming. |
| Cobalt naphthanate | .05–4 | Polyester accelerator or promoter. |
| Boron Trifluoride | ½–7 | Epoxy hardener. |
| Blowing Agent | 10–40 | Provides vapor for expansion to form foam. |
| Surface active agent | ½–2 | To insure uniform cell structure and size. |
| Peroxide | ½–6 | Polyester initiator. |

It will be understood that the specific examples referred to above are illustrative, and while preferred, may be substituted by their known equivalents.

The following examples illustrate but do not limit the invention:

POLYESTER A

An unsaturated polyester base is prepared by charging the following ingredients expressed in the mol ratio specified into a 3 necked 5 liter flask, equipped with stirrer, thermometer, inert gas sparge, bubble cap column and heating mantle. The reactants are brought up to 200° C. and kept there until an acid number of about 30–40 is reached. At the termination of the condensation reaction, the alkyd is brought down to about 180° C. and .008% hydroquinone is added to the alkyd. After the alkyd temperature has dropped to 160° C., it is thinned with styrene at a ratio of 70 parts alkyd to 30 parts styrene. The other polyesters formulated were treated in a like manner.

|  | Mol ratio |
|---|---|
| Phthalic anhydride | 2 |
| Maleic anhydride | 1 |
| Propylene glycol, a 10% mol excess glycol | 3.3 |

POLYESTER B

The unsaturated polyester resin is processed the same as Polyester A; only the proportions of the components have ben changed:

|  | Mol ratio |
|---|---|
| Phthalic anhydride | 1 |
| Maleic anhydride | 2 |
| Propylene glycol, a 10% mol excess glycol | 3.3 |

The alkyd was thinned in a ratio of 70 gm. alkyd to 30 gm. sytrene.

POLYESTER C

|  | Mol ratio |
|---|---|
| Maleic anhydride | 2 |
| Phthalic anhydride | .2 |
| Adipic acid | .8 |
| Propylene glycol, a 10% mol excess glycol | 3.3 |

The alkyd was thinned in a ratio of 80 gm. alkyd to 20 gm. styrene.

POLYESTER D

|  | Mol ratio |
|---|---|
| Maleic anhydride | 2.5 |
| Het acid (chlorendic acid) | 3.5 |
| Ethylene glycol | 3.3 |
| Propylene glycol, a total of 10% mol excess glycol | 3.3 |

The alkyd was thinned in a ratio of 80 gm. alkyd to 20 gm. styrene.

*Example I*

A 200 ml. beaker equipped with a stirrer contained 100 gm. of Polyester A. To this was added ½% of 6% cobalt. The viscosity of the polyester resin was adjusted to 800 c.p.s. with styrene. A glass tube connected to a carbon dioxide line was secured so that a steady stream of gas bubbled through the polyester. Agitating was commenced and then 1% methyl ethyl ketone peroxide was added. After about 25 minutes, the polyester gelled onto the stirrer without any foaming having occurred.

*Example II*

The same procedure is followed as in Example I, except for the omission of the gas sparge and the inclusion of 30 gms. of Freon 11. After about 30 minutes, the polyester gelled, not having foamed.

*Example III*

| | |
|---|---|
| Polyester A | gm__ 50 |
| Epoxy A | gm__ 50 |
| Styrene monomer | gm__ 10 |
| Freon 11 | gm__ 30 |
| Pluronic L62 | gm__ 2 |
| 6% cobalt naphthanate | percent__ .5 |

The above are mixed and can be stored as such. When the reaction is to proceed, 6 gm. of boron trifluoride etherate is added to the mix, stirred in well, and allowed to react with the epoxy resin until a slight rise in temperature is noted. Then 1.5 ml. of methyl ethyl ketone peroxide is added and the mixture is stirred slowly until foaming begins. The slightly foaming fluid is poured into its intended void and foaming then commences.

A white hard foam is produced with a density of 1.4 lbs. per cubic foot. The surface was free of tack and did not soften when heated at 100° C. for one hour. No shrinkage was observed after this treatment.

The procedure in the following foams is essentially the same as that described here, except where otherwise stated:

*Example IV*

| | | |
|---|---|---|
| Polyester A | gm | 70 |
| Epoxy A | gm | 30 |
| Freon 11 | gm | 25 |
| Pluronic L62 | gm | 2 |
| Cobalt Naphthanate | ml | .6 |

After mixing—4 gm. boron trifluoride etherate and then 2 ml. methyl ethyl ketone peroxide were added. This foam did not rise as high as the Example I foam, since it contains less epoxy resin and less heat is dissipated to the Freon 11. It also took longer to foam and gel because of this reason. It will be understood that by—Epoxy A—reference is had to the well known commercial reaction products of epichlorhydrin with bisphenol A, previously referred to herein.

*Example V*

Same as Example III except that Polyester B is employed. The foam is very rigid and has good strength properties.

*Example VI*

This compostion is the same as Example II, except that the methyl ethyl ketone peroxide is added prior to the $BF_3$. It was found that the gel time of the polyester in this system is substantially lengthened (15 min.—24 hours) and little danger exists of gelling the mix prior to addition of the $BF_3$.

*Example VII*

| | | |
|---|---|---|
| Polyester C | gm | 60 |
| Epoxy A | gm | 40 |
| Styrene Monomer | gm | 15 |
| Freon 11 | gm | 25 |
| Pluronic L62 | gm | 1.5 |
| 6% cobalt | percent | .6 |

To this stock mixture was added 5 gm. $BF_3$ and then 2 ml. methyl ethyl ketone peroxide. A fine celled white foam which exhibited some flexibility when compressed, resulted. It had a density of about 2 lb./cu. ft.

*Example VIII*

Same as Example VII, except for the omission of epoxy A and styrene monomer and inclusion of 20 gm. epoxide B. This foam was slightly browned, noticeably in the center where the heat build up was most severe.

*Example IX*

Same as Example VIII, except for the omission of Polyester C and inclusion of Polyester D. The flame retardancy of the foam was tested by placing a sample in the flame of a Bunsen burner. It was removed after ignition and the flame extinguished almost immediately.

What is claimed is:

1. A process for producing a cured resinous foam which comprises mixing a vaporizable blowing agent comprising a normally liquid inert organic compound having a boiling point between about 20° C. and 60° C. with a blend of (A) an unsaturated polyester resin of (a) a polyhydric alcohol, and (b) a dicarboxylic acid, wherein at least one member contains alpha beta ethylenic unsaturation, and a polymerizable monomer having carbon to carbon ethylenic unsaturation, and (B) an epoxy compound having an oxirane structure of the general formula

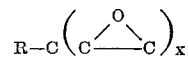

wherein R is selected from a group consisting of aliphatic, aromatic and mixed aliphatic-aromatic radicals and wherein X is an integer not exceeding 20 units; incorporating in the mixture a non-ionic surface acting agent, a polyester polymerization initiator comprising a peroxide catalyst and a polymerization accelerator, and an epoxy hardener comprising a Lewis acid, the heat resulting from the curing of the epoxide being utilized to vaporize the blowing agent and to heat the mixture, whereby the entire composition expands and cures to produce a resinous foam without the necessity for the application of external heat.

2. The foamed product of the process of claim 1.

3. A process for producing a cured resinous foam which comprises mixing at least one blowing agent selected from the class of vaporizable liquid inert organic compounds with a blend of
    (A) a mixture consisting of (1) an unsaturated polyester resin of (a) a polydric alcohol, and (b) a dicarboxylic acid, wherein at least one member contains alpha beta ethylenic unsaturation, and (2) polymerizable monomers containing carbon to carbon ethylenic unsaturation, and
    (B) an epoxy component containing the epoxide group; and incorporating therein a non-ionic surface active agent, a promoter and peroxide catalyst and a Lewis acid, whereby the entire resinous composition expands and cures in expanded condition to a resinous foam.

4. The process of claim 3, wherein the blowing agent is trichloro monofluoro methane and forms 10–40% by weight of the base mixture.

5. The process of claim 3, wherein the surface active agent is a poly oxy glycol having the following structure

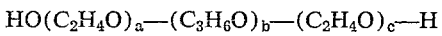

where the $a$ and $c$ portions constitute from about 16% to about 80% of the total weight of the non-ionic surface active agent.

6. The process of claim 3, wherein the polyester promoter is cobalt naphthenate in the range of from about .025% to about 3%.

7. The process of claim 3, wherein the Lewis acid is boron trifluoride etherate in the range of 1–10% by weight af base foam mixture.

8. The process of claim 3, wherein the weight ratios of A to B is between 90 to 10 and about 50–50.

9. The process of claim 8 wherein B is an epoxide or poly epoxide containing compound capable of reacting with a Lewis acid, the compound being selected from the class of aromatic and aliphatic epoxides.

10. The process of claim 9, wherein "B" epoxy is an epoxy resin having the following structure

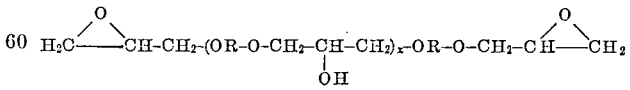

where X is the average number of such units and R symbolizes a hydro carbon radical of a dihydric phenol.

11. The process of claim 10 wherein B is a liquid epoxy resin having an epoxy equivalent of about 160–200.

12. The process of claim 11, wherein the peroxide catalyst is methyl ethyl ketone peroxide in the range of ½ to 3% by weight of the base mix.

13. The process of claim 11, wherein the peroxide catalyst is hydrogen peroxide.

14. The process of claim 11, wherein 50% hydrogen peroxide catalyst is employed in a range of ½ to 5% by weight of the base foam mixture.

15. The process of claim 9, wherein B is epichlorohydrin having the following structure

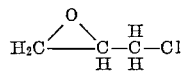

16. A process of claim 15, wherein the ratio of epichlorohydrin to polyester resin is from 10–90 to 40–60.

17. The product of claim 15.

18. The process of claim 3 wherein A is a flame retardant polyester incorporating chlorendic acid as at least 30 mol percent of the dicarboxylic acids and the ratio of A to B between 90–10 to about 70–30.

References Cited by the Examiner

UNITED STATES PATENTS

| | | | |
|---|---|---|---|
| 2,498,621 | 2/1950 | Kropa et al. | 260—2.5 |
| 2,859,199 | 11/1958 | Parker | 260—835 |
| 3,046,851 | 7/1962 | De Vries | 260—840 |
| 3,051,665 | 8/1962 | Wismer et al. | 260—2.5 |

FOREIGN PATENTS

| | | |
|---|---|---|
| 652,770 | 5/1951 | Great Britain. |

MURRAY TILLMAN, *Primary Examiner.*

LEON J. BERCOVITZ, *Examiner.*